US009200693B2

(12) United States Patent
Lim

(10) Patent No.: US 9,200,693 B2
(45) Date of Patent: Dec. 1, 2015

(54) PISTON VALVE ASSEMBLY FOR SHOCK ABSORBER

(71) Applicant: MANDO CORPORATION, Pyeongtaek-si (KR)

(72) Inventor: Jun Hyuk Lim, Seongnam-si (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 0 days.

(21) Appl. No.: 14/305,925

(22) Filed: Jun. 16, 2014

(65) Prior Publication Data
US 2015/0041269 A1 Feb. 12, 2015

(30) Foreign Application Priority Data

Aug. 8, 2013 (KR) .................. 10-2013-0094377

(51) Int. Cl.
*F16F 9/512* (2006.01)
*F16F 9/348* (2006.01)

(52) U.S. Cl.
CPC .............. *F16F 9/5126* (2013.01); *F16F 9/348* (2013.01)

(58) Field of Classification Search
CPC ........... F16F 9/34; F16F 9/348; F16F 9/3214; F16F 9/466; F16F 9/3405; F16F 9/3485; F16F 9/5126
USPC ......... 188/313, 316, 317, 319.1, 320, 322.13, 188/322.15
See application file for complete search history.

(56) References Cited

U.S. PATENT DOCUMENTS

| 2005/0045440 | A1* | 3/2005 | Kock et al. | 188/322.15 |
| 2005/0056501 | A1* | 3/2005 | de Molina | 188/284 |
| 2005/0056506 | A1* | 3/2005 | Deferme | 188/322.15 |
| 2012/0048666 | A1* | 3/2012 | Murakami | 188/315 |
| 2013/0333993 | A1* | 12/2013 | Yu | 188/322.22 |
| 2014/0231199 | A1* | 8/2014 | Kim et al. | 188/313 |
| 2015/0027829 | A1* | 1/2015 | Nowaczyk et al. | 188/313 |
| 2015/0114774 | A1* | 4/2015 | Kim | 188/322.15 |

FOREIGN PATENT DOCUMENTS

| KR | 10-2007-0049795 | 5/2007 |
| KR | 10-2012-0021258 | 3/2012 |

* cited by examiner

*Primary Examiner* — Vishal Sahni
(74) *Attorney, Agent, or Firm* — Ladas & Parry, LLP

(57) ABSTRACT

In a piston valve assembly for a shock absorber, a main piston partitions a cylinder into an upper chamber and a lower chamber. Compression passages and rebound passages penetrate the main piston in a vertical direction. A first compression value forms a first compression chamber, and a top surface of a lower retainer is opened toward the upper chamber. Bypass passages are formed on an outer peripheral surface of the piston rod. A guide assembly surrounds an outer peripheral surface of the compression valve and the bottom surface of the compression valve, tightly contacts the bottom surface of the compression valve in a high-frequency section, and moves down toward the lower retainer in a low-frequency section. A lower disk assembly forms a second compression chamber in the lower retainer while covering the opened top surface of the lower retainer, communicates the second compression chamber with the lower chamber in the high-frequency section, and blocks the communication between the second compression chamber and the lower chamber in the low-frequency section due to the downward movement of the guide assembly.

7 Claims, 2 Drawing Sheets

PISTON VALVE ASSEMBLY FOR SHOCK ABSORBER

CROSS-REFERENCE(S) TO RELATED APPLICATION

This application claims priority of Korean Patent Application No. 10-2013-0094377, filed on Aug. 8, 2013, in the Korean Intellectual Property Office, the contents of which are incorporated herein by reference in its entirety.

BACKGROUND OF THE INVENTION

1. Field of the Invention

The present invention relates to a piston valve assembly for a shock absorber, and more particularly, to a piston valve assembly for a shock absorber, which is capable of improving a ride comfort by realizing generation of a damping force sensitive to both pressure and frequency.

2. Description of the Related Art

In general, suspension systems are installed in vehicles so as to improve a ride comfort by absorbing and damping a vibration or shock which is transferred from a road surface to an axle during driving. As one of such suspension systems, a shock absorber is used.

The shock absorber operates with a vibration of a vehicle according to a condition of a road surface. At this time, a damping force generated by the shock absorber is changed according to an operating speed of the shock absorber, that is, a high or low operating speed of the shock absorber.

A ride comfort and a driving stability of a vehicle may be controlled according to how to adjust a characteristic of a damping force generated by the shock absorber.

In this regard, an existing frequency-sensitive shock absorber or an existing pressure-sensitive shock absorber has a valve structure that realizes similar operational effects in terms of functions. However, parts for pressure sensitivity and parts for frequency sensitivity must be separately provided. Consequently, the number of parts is increased as many, and the rise in production cost is inevitable.

In particular, since such a problem has an additional problem that the total length of the piston valve assembly is increased, there are many limitations to applying the conventional piston valve assembly to small- and medium-sized vehicles.

CITATION LIST

Patent Literature (Patent Literature 1) Korean Patent Application No. 10-2005-0106961
(Patent Literature 2) Korean Patent Application No. 10-2011-0087171

SUMMARY OF THE INVENTION

The present invention has been made in an effort to solve the above problems, and is directed to provide a piston valve assembly for a shock absorber, which is capable of improving a ride comfort by realizing generation of a damping force sensitive to both pressure and frequency.

In addition, the present invention is directed to provide a piston valve assembly for a shock absorber, which is capable of widely applying to various types of vehicles, such as small- and medium-sized vehicles, by realizing a reduction in the whole size of the apparatus.

According to an embodiment of the present invention, a piston valve assembly for a shock absorber includes: a piston rod reciprocating within a cylinder; a main piston mounted on the piston rod and partitioning the cylinder into an upper chamber and a lower chamber, wherein a plurality of compression passages and a plurality of rebound passages penetrate the main piston in a vertical direction; a compression valve mounted on the piston rod and disposed under the main piston, wherein the first compression value forms a first compression chamber on a bottom surface, the first compression chamber having a ring shape around the piston rod toward the lower chamber; a lower retainer mounted on the piston rod and disposed under the compression valve, wherein a top surface of the lower retainer is opened toward the upper chamber; a plurality of bypass passages formed on an outer peripheral surface of the piston rod from an upper side of the main piston to an upper side of the lower retainer along a vertical length direction; a guide assembly mounted on the piston rod and disposed between the compression valve and the lower retainer, wherein the guide assembly surrounds an outer peripheral surface of the compression valve and the bottom surface of the compression valve, tightly contacts the bottom surface of the compression valve in a high-frequency section, and moves down toward the lower retainer in a low-frequency section; and a lower disk assembly mounted on the piston rod and disposed between the guide assembly and the lower retainer, wherein the lower disk assembly forms a second compression chamber in the lower retainer while covering the opened top surface of the lower retainer, communicates the second compression chamber with the lower chamber in the high-frequency section, and blocks the communication between the second compression chamber and the lower chamber in the low-frequency section due to the downward movement of the guide assembly.

The piston valve assembly for the shock absorber may further include: a first orifice provided on the bottom surface of the compression valve to communicate the bypass passages with the first compression chamber; and a second orifice provided in a central portion of the lower retainer to communicate the bypass passages with the second compression chamber.

A passage cross-sectional area of the second orifice may be larger than a passage cross-sectional area of the first orifice.

The guide assembly may include: a first disk having a center penetrated by the piston rod, an inner edge contacting a first sheet provided around the piston rod along an inner edge of a ring-shaped groove of the compression valve that forms the first compression chamber, and an outer edge tightly contacting an outside of an outer edge of the ring-shaped groove, and allows an elastic deformation according to an amount of compressed fluid introduced from the bypass passages to the first compression chamber through the first orifice provided in the first sheet to form a passage communicating with the first compression chamber; a second disk having a center penetrated by the piston rod, wherein the second disk has the same shape as the first disk, is disposed separately under the first disk, and is interlocked with the elastic deformation of the first disk; a first spacer having a center penetrated by the piston rod, wherein the first spacer is mounted between the first disk and the second disk such that the first disk and the second disk are spaced apart from each other by a predetermined distance; a second spacer having a center penetrated by the piston rod, wherein the second spacer is mounted between the second disk and the lower disk assembly such that the second disk and the lower disk assembly are spaced apart from each other by a predetermined distance; a ring support piece having a thickness corresponding to the first spacer and having a ring shape, wherein the ring support piece has an inner edge fixed between outer edges of the first and second disks; a guide wall extending along an outer edge of the ring support piece and facing the outer peripheral surface of the compression valve; and an O-ring fitted into a ring-shaped mounting groove recessed along the outer peripheral surface of the compression valve and tightly supported to an inner peripheral surface of the guide wall.

The lower retainer may include: a ring-shaped second sheet provided around the piston rod and protruding to be stepped from a central portion of the lower retainer; and a ring-shaped third sheet protruding to be stepped from an outer edge of the lower retainer, wherein the second compression chamber communicating with the bypass passages is formed between a bottom outer edge of the lower disk assembly and the second and third sheets.

The lower retainer may further include a second orifice recessed from the central portion of the lower retainer on a top surface of the second sheet in a radial direction and communicating the bypass passages with the second compression chamber.

A volume of the first compression chamber may be larger than or equal to a volume of the second compression chamber.

DETAILED DESCRIPTION OF EXEMPLARY EMBODIMENTS

Hereinafter, exemplary embodiments of the present invention will be described in detail with reference to the accompanying drawings.

Figure 1:
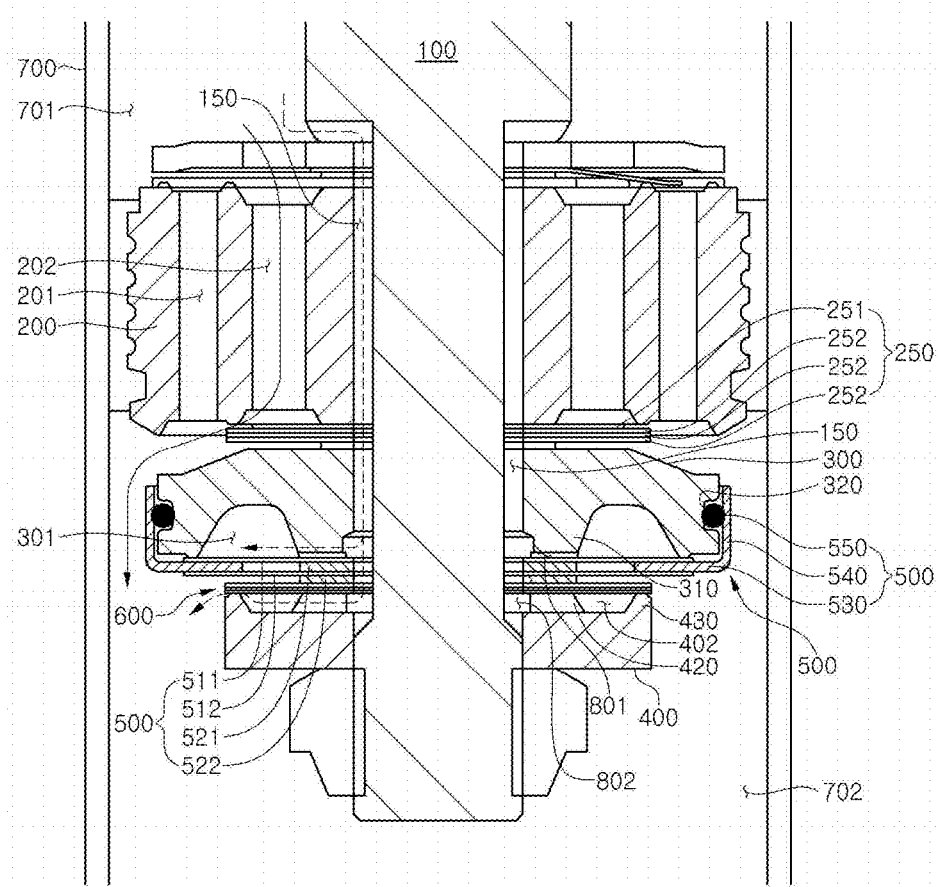
FIG. 1 is a cross-sectional conceptual diagram illustrating an overall structure of a piston valve assembly for a shock absorber according to an embodiment of the present invention.

FIG. 1 is a cross-sectional conceptual diagram illustrating an overall structure of a piston valve assembly for a shock absorber according to an embodiment of the present invention.

For reference, in FIG. 1, a solid-line arrow represents a flow of compressed fluid in a high-speed driving section, and a dashed-line arrow represents a flow of compressed fluid in a low-speed driving section.

As illustrated, a piston valve assembly for a shock absorber according to an embodiment of the present invention includes a piston rod 100, a main piston 200, a pressure valve 300, a lower retainer 400, a bypass passage 150, a guide assembly 500, and a lower disk assembly 600.

The piston rod 100 reciprocates within a cylinder 700, provides a space where the main piston 200, the pressure valve 300, the lower retainer 400, the guide assembly 500, and the lower disk assembly 600 are to be mounted, and provides an area where the bypass passage 150 is to be formed.

The main piston 200 is mounted on the piston rod 100. A plurality of compression passages 201 and a plurality of rebound passages 202 pass through the main piston 200 in a vertical direction. The main piston 200 partitions the cylinder 700 into an upper chamber 701 and a lower chamber 702.

The compression valve 300 is mounted on the piston rod 100 and is disposed under the main piston 200. The compression valve 300 forms a first compression chamber 301 on a bottom surface. The first compression chamber 301 has a ring shape around the piston rod 100 toward a lower chamber 702.

The lower retainer 400 is mounted on the piston rod 100 and is disposed under the compression valve 300. A top surface of the lower retainer 400 is opened toward the upper chamber 701.

A plurality of bypass passages 150 are formed on the outer peripheral surface of the piston rod 100 from an upper side of the main piston 200 to an upper side of the lower retainer 400 along a vertical length direction.

The guide assembly 500 is mounted on the piston rod 100 and is disposed between the compression valve 300 and the lower retainer 400. The guide assembly 500 surrounds the outer peripheral surface of the compression valve 300 and the bottom surface of the compression valve 300. The guide assembly 500 tightly contacts the bottom surface of the compression valve 300 in the high-frequency section and moves down toward the lower retainer 400 in the low-frequency section.

The lower disk assembly 600 is mounted on the piston rod 100 and is disposed between the guide assembly 500 and the lower retainer 400. The lower disk assembly 600 forms a second compression chamber 402 in the lower retainer 400 while covering the opened top surface of the lower retainer 400. The lower disk assembly 600 communicates the second compression chamber 402 with the lower chamber 702 in the high-frequency section and blocks the communication between the second compression chamber 402 and the lower chamber 702 in the low-frequency section due to the downward movement of the guide assembly 500.

Therefore, according to the present invention, since the above-described components achieve the generation of the damping force sensitive to both the pressure and the frequency, a blow-off graph changes from a step shape to a curved shape, thereby improving a ride comfort.

In addition to the above-described embodiment, the following various embodiments can also be applied to the present invention.

The piston rod 100 penetrates between the main piston 200 and the compression valve 300. The piston valve assembly further includes a main disk assembly 250 that is provided by stacking a disk S 251 and a plurality of disks 252 from above.

The piston valve assembly for the shock absorber according to the embodiment of the present invention further includes first and second orifices 801 and 802 connected to the bypass passage 150.

The first orifice 801 is provided on the bottom surface of the compression valve 300 to communicate the bypass passage 150 with the first compression chamber 301.

The second orifice 802 is provided in the central portion of the lower retainer 400 to communicate the bypass passage 150 with the second compression chamber 402.

Herein, the passage cross-sectional area of the second orifice 802 is designed to be larger than the passage cross-sectional area of the first orifice 801.

On the other hand, as described above, the lower retainer 400 forms the second compression chamber 402 with the lower disk assembly 600, and includes second and third sheets 420 and 430.

The second sheet 420 is provided around the piston rod 100 and protrudes in a ring shape to be stepped from the central portion of the lower retainer 400.

The third sheet 430 protrudes in a ring shape to be stepped from the outer edge of the lower retainer 400.

Therefore, the second compression chamber 402 communicating with the bypass passage 150 is formed between the bottom outer edge of the lower disk assembly 600 and the second and third sheets 420 and 430, and the second orifice is provided in the second sheet 420.

Specifically, the second orifice 802 is recessed from the central portion of the lower retainer 400 on the top surface of the second sheet 420 in a radial direction, and communicates the bypass passage 150 with the second compression chamber 402.

On the other hand, it is preferable that the volume of the first compression chamber 301 is larger than or equal to the volume of the second compression chamber 402.

This is done for increasing the damping force in such a manner that the compressed fluid received in the first compression chamber 301 blocks the opening of the lower disk assembly 600 while pressing the guide assembly 500, which is to be described below, in a state in which a sufficient amount of the compressed fluid is received in the low-frequency section.

On the other hand, as described above, the guide assembly 500 tightly contacts the bottom surface of the compression valve 300 in the high-frequency section and moves down toward the lower retainer 400 in the low-frequency section. The guide assembly 500 includes first and second disks 511 and 512, first and second spacers 521 and 522, a ring support piece 530, a guide wall 540, and an O-ring 550.

The piston rod 100 penetrates the center of the first disk 511, and the inner edge of the first disk 511 contacts the first sheet 310 provided around the piston rod 100 along an inner edge of a ring-shaped groove that forms the first compression chamber 301 of the compression valve 300.

An outer edge of the first disk 511 tightly contacts an outside of an outer edge of the ring-shaped groove, and allows an elastic deformation according to an amount of compressed fluid introduced from the bypass passage 150 to the first compression chamber 301 through the first orifice provided in the first sheet 310 to form the passage communicating with the first compression chamber 301.

The piston rod 100 penetrates the center of the second disk 512. The second disk 512 has the same shape as the first disk 511, is disposed separately under the first disk 511, and is interlocked with the elastic deformation of the first disk 511.

The piston rod 100 penetrates the center of the first spacer 521, and the first spacer 521 is mounted between the first disk 511 and the second disk 512 such that the first disk 511 and the second disk 512 are spaced apart from each other by a predetermined distance.

The piston rod 100 penetrates the center of the second spacer 522, and the second spacer 522 is mounted between the second disk 512 and the lower disk assembly 600 such that the second disk 512 and the lower disk assembly 600 are spaced apart from each other by a predetermined distance.

A ring support piece 530 is a ring-shaped member that has a thickness corresponding to the first spacer 521 and has an inner edge fixed between outer edges of the first and second disks 511 and 512.

The guide wall 540 extends along an outer edge of the ring support piece 530 and faces the outer peripheral surface of the compression valve 300.

The O-ring 550 is fitted into a ring-shaped mounting groove 320 recessed along the outer peripheral surface of the compression valve 300 and is tightly supported to an inner peripheral surface of the guide wall 540.

Referring to the structure of the piston valve assembly for the shock absorber according to the embodiment of the present invention, the operations of the respective components according to the pressure of the compressed fluid in the high-frequency section and the low-frequency section will be described briefly with reference to FIGS. 2 and 3.

Figure 2:
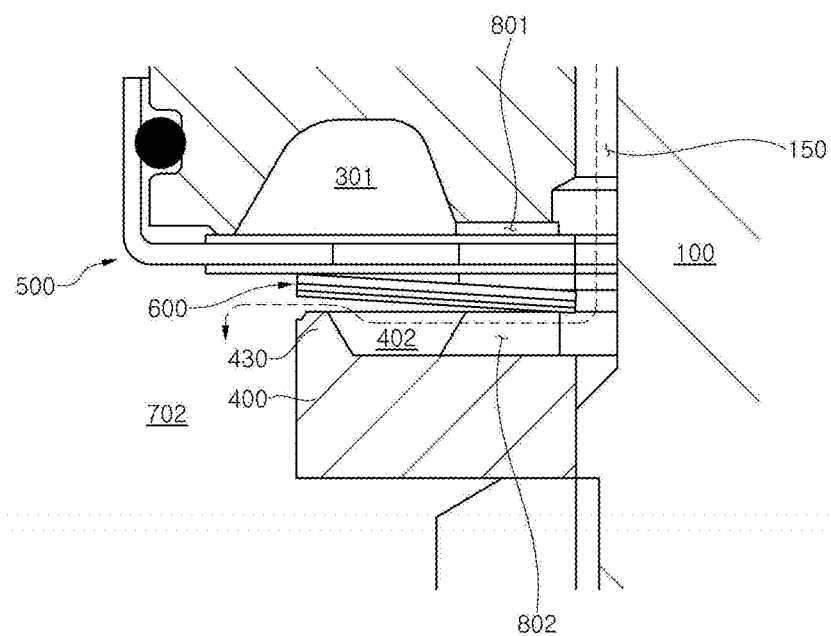
FIGS. 2 and 3 are cross-sectional conceptual diagrams illustrating operations of the piston valve assembly for the shock absorber according to frequency and pressure according to the embodiment of the present invention.

First, in the high-frequency section in which small amplitude is maintained, as illustrated in FIG. 2, the compressed fluid introduced through the bypass passage 150 of the piston rod 100 does not flow into the first compression chamber 301 because an inflow resistance is generated due to a small cross-sectional area of the first orifice 801. Consequently, the increase in the pressure of the first compression chamber 301 is limited.

Then, the compressed fluid flows into the second compression chamber 402 through the second orifice 801. When an amount of the inflowing compressed fluid is increased, the lower disk assembly 600 is opened toward the lower chamber 702, thus implementing the damping force.

Figure 3:
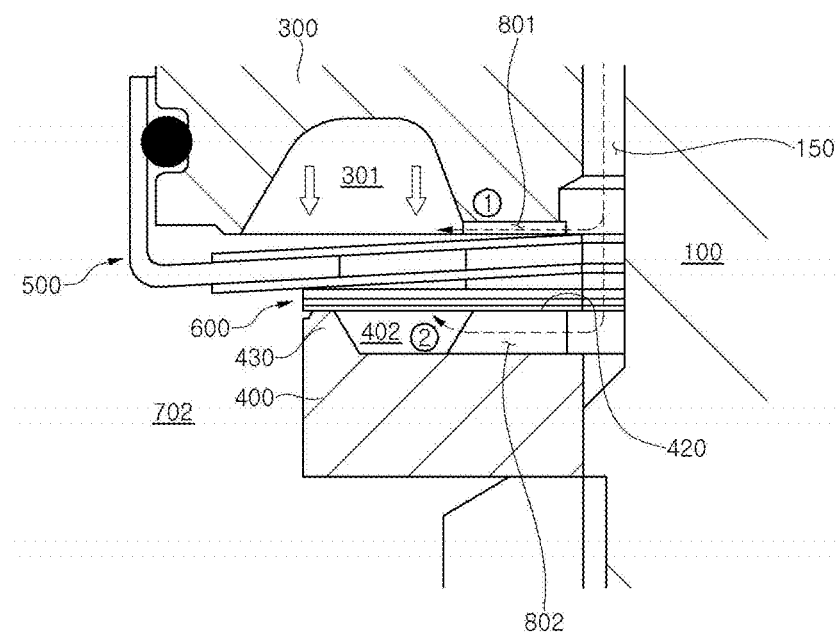

On the other hand, in the low-frequency section in which large amplitude is maintained, as illustrated in FIG. 3, the compressed fluid introduced through the bypass passage 150 of the piston rod 100 flows into the first compression chamber 301 through the first orifice 801. When a sufficient amount of the compressed fluid flows into the first compression chamber 301, the guide assembly 500 moves downward due to the self weight of the inflowing compressed fluid and the pressure applied in an arrow direction.

At this time, a part of the compressed fluid also flows into the second compression chamber 402 through the second orifice 802.

Then, the guide assembly 500 moves downward and presses the upper side of the outer edge of the lower disk assembly 600 to thereby increase the damping force while blocking the communication between the lower disk assembly 600 and the lower chamber 702.

As described above, the basic technical idea of the present invention is to provide a piston valve assembly for a shock absorber, which is capable of improving a ride comfort by realizing generation of a damping force sensitive to both pressure and frequency, and widely applying to various types of vehicles, such as small- and medium-sized vehicles, by realizing a reduction in the whole size of the apparatus.

The above-described configurations according to the present invention can obtain the following effects.

By providing the second compression chamber together with the compression valve including the first compression chamber communicating with the bypass passages of the piston rod, the guide assembly, and the lower disk assembly, the damping force sensitive to the pressure and the frequency is implemented from the structure communicating with the bypass passages, thereby improving a ride comfort.

In particular, the blow-off can be reduced because the operation sections of the main disk and the lower disk assembly provided on the main piston are overlapped, and the damping force can be implemented in a wide frequency section from a low-frequency section to a high-frequency section as the operation area of the lower disk assembly is expanded.

Moreover, as compared with the existing shock absorber that needs to individually mount compression-sensitive parts and frequency-sensitive parts, the shock absorber according to the present invention can implement the damping force sensitive to both the pressure and the frequency, and therefore, can be widely applied to various types of vehicles, such as small- and medium-sized vehicles, by realizing a reduction in the whole size of the apparatus.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 110: piston rod | 150: bypass passage |
| 200: main piston | 201: compression passage |
| 202: rebound passage | 300: compression valve |
| 301: first compression chamber | 310: first sheet |
| 400: lower retainer | 402: second compression chamber |
| 420: second sheet | 430: third sheet |

What is claimed is:

1. A piston valve assembly for a shock absorber, comprising:
a piston rod reciprocating within a cylinder;
a main piston mounted on the piston rod and partitioning the cylinder into an upper chamber and a lower chamber, wherein a plurality of compression passages and a plurality of rebound passages penetrate the main piston in a vertical direction;
a compression valve mounted on the piston rod and disposed under the main piston, wherein the compression valve forms a first compression chamber on a bottom surface, the first compression chamber having a ring shape around the piston rod toward the lower chamber;
a lower retainer mounted on the piston rod and disposed under the compression valve, wherein a top surface of the lower retainer is opened toward the upper chamber;
a plurality of bypass passages formed on an outer peripheral surface of the piston rod from an upper side of the main piston to an upper side of the lower retainer along a vertical length direction;
a guide assembly mounted on the piston rod and disposed between the compression valve and the lower retainer, wherein the guide assembly surrounds an outer peripheral surface of the compression valve and the bottom surface of the compression valve, tightly contacts the bottom surface of the compression valve in a high-frequency section, and moves down toward the lower retainer in a low-frequency section; and
a lower disk assembly mounted on the piston rod and disposed between the guide assembly and the lower retainer, wherein the lower disk assembly forms a second compression chamber in the lower retainer while covering the opened top surface of the lower retainer, communicates the second compression chamber with the lower chamber in the high-frequency section, and blocks the communication between the second compression chamber and the lower chamber in the low-frequency section due to the downward movement of the guide assembly.

2. The piston valve assembly for the shock absorber according to claim 1, further comprising:
a first orifice provided on the bottom surface of the compression valve to communicate the bypass passages with the first compression chamber; and
a second orifice provided in a central portion of the lower retainer to communicate the bypass passages with the second compression chamber.

3. The piston valve assembly for the shock absorber according to claim 2, wherein a passage cross-sectional area of the second orifice is larger than a passage cross-sectional area of the first orifice.

4. The piston valve assembly for the shock absorber according to claim 1, wherein the guide assembly comprises:
a first disk having a center penetrated by the piston rod, an inner edge contacting a first sheet provided around the piston rod along an inner edge of a ring-shaped groove of the compression valve that forms the first compression chamber, and an outer edge tightly contacting an outside of an outer edge of the ring-shaped groove, and allows an elastic deformation according to an amount of compressed fluid introduced from the bypass passages to the first compression chamber through the first orifice provided in the first sheet to form a passage communicating with the first compression chamber;
a second disk having a center penetrated by the piston rod, wherein the second disk has the same shape as the first disk, is disposed separately under the first disk, and is interlocked with the elastic deformation of the first disk;
a first spacer having a center penetrated by the piston rod, wherein the first spacer is mounted between the first disk and the second disk such that the first disk and the second disk are spaced apart from each other by a predetermined distance;
a second spacer having a center penetrated by the piston rod, wherein the second spacer is mounted between the second disk and the lower disk assembly such that the second disk and the lower disk assembly are spaced apart from each other by a predetermined distance;
a ring support piece having a thickness corresponding to the first spacer and having a ring shape, wherein the ring support piece has an inner edge fixed between outer edges of the first and second disks;
a guide wall extending along an outer edge of the ring support piece and facing the outer peripheral surface of the compression valve; and
an O-ring fitted into a ring-shaped mounting groove recessed along the outer peripheral surface of the compression valve and tightly supported to an inner peripheral surface of the guide wall.

5. The piston valve assembly for the shock absorber according to claim 1, wherein the lower retainer comprises:
a ring-shaped second sheet provided around the piston rod and protruding to be stepped from a central portion of the lower retainer; and
a ring-shaped third sheet protruding to be stepped from an outer edge of the lower retainer,
wherein the second compression chamber communicating with the bypass passages is formed between a bottom outer edge of the lower disk assembly and the second and third sheets.

6. The piston valve assembly for the shock absorber according to claim 5, wherein the lower retainer further comprises a second orifice recessed from the central portion of the lower retainer on a top surface of the second sheet in a radial direction and communicating the bypass passages with the second compression chamber.

7. The piston valve assembly for the shock absorber according to claim 1, wherein a volume of the first compression chamber is larger than or equal to a volume of the second compression chamber.

* * * * *